United States Patent [19]

Sheehan et al.

[11] Patent Number: 5,367,754
[45] Date of Patent: Nov. 29, 1994

[54] GANG TOOLING FOR A COMPUTERIZED NUMERICALLY CONTROLLED LATHE

[75] Inventors: Terrence M. Sheehan, Elmire; Ramesh M. Kamath, Elmire Heights; Harold E. Walburn; Jack F. Sheehan, both of Elmira, all of N.Y.

[73] Assignee: Hardinge Brothers, Inc., New York, N.Y.

[21] Appl. No.: 677,580

[22] Filed: Mar. 29, 1991

[51] Int. Cl.⁵ .................. B23B 29/24; B23D 39/02
[52] U.S. Cl. .................. 29/27 C; 29/50; 82/138; 82/158
[58] Field of Search .......... 29/50, 52, 54, 55, 27 C, 29/27 R; 483/17, 19; 82/138, 158, 159, 160, 118, 121, 129

[56] References Cited

U.S. PATENT DOCUMENTS

| 872,233 | 11/1907 | Hartness . | |
|---|---|---|---|
| 1,353,686 | 9/1920 | Wallace . | |
| 1,454,611 | 5/1923 | Adair . | |
| 1,626,953 | 5/1927 | Müller | 82/158 |
| 2,052,441 | 8/1936 | Bickel | 82/158 X |
| 2,348,908 | 5/1944 | Jacobs | 29/54 X |
| 2,930,155 | 3/1960 | Becker | 40/2 |
| 3,280,673 | 10/1966 | Holmes et al. . | |
| 3,282,138 | 11/1966 | Stockmann et al. . | |
| 3,354,760 | 11/1967 | Barragan | 82/2 |
| 3,448,643 | 6/1969 | Kulin . | |
| 3,572,193 | 3/1971 | Jeanneret . | |
| 3,575,072 | 4/1971 | Silver et al. | 82/158 X |
| 3,691,613 | 9/1972 | Walk | 29/27 C |
| 4,057,294 | 11/1977 | Krekeler | 407/101 |
| 4,100,826 | 7/1978 | Takahashi | 82/138 |
| 4,164,880 | 8/1979 | DiMarco | 82/158 |
| 4,275,625 | 6/1981 | Tomlinson . | |
| 4,308,771 | 1/1982 | Windle | 29/52 |
| 4,515,049 | 5/1985 | Dietz et al. | 82/158 |
| 4,533,823 | 8/1985 | Vittorio | 235/375 |
| 4,571,796 | 2/1986 | Seillner et al. | 29/27 R |
| 4,704,773 | 11/1987 | Quinart et al. | 29/55 X |
| 4,759,244 | 7/1988 | Engibarov | 407/87 X |
| 4,831,906 | 5/1989 | Sugimoto et al. | 82/118 |
| 4,938,110 | 7/1990 | Ruby | 82/138 |
| 4,949,443 | 8/1990 | Saruwatari et al. | 29/27 C |

FOREIGN PATENT DOCUMENTS

| 0152301 | 7/1986 | Japan | 82/129 |
|---|---|---|---|
| 0197103 | 9/1986 | Japan | 82/118 |

Primary Examiner—Z. R. Bilinsky
Attorney, Agent, or Firm—Cushman, Darby & Cushman

[57] ABSTRACT

A gang tooling is disclosed for a lathe having a main spindle with an axis of rotation, a longitudinal carriage movable along a z-axis parallel to the spindle axis and a cross-slide carried by the longitudinal carriage and movable along a x-axis transverse to the spindle axis. The gang tooling comprises a longitudinal plate for removably securing to the cross-slide. The plate has a dovetail mortise and a wedge that cooperates with a dovetail tenon on the cross-slide for removably securing the plate to the cross-slide. The plate has a dovetail tenon for cooperating with a dovetail mortise in a plurality of tool holders for removably securing the tool holders to the plate. The plate can be removed from the cross-slide without disturbing and removing the tools installed on the plate, thereby permitting the tool holders to remain secured to the plate at their original relative positions.

59 Claims, 11 Drawing Sheets

GANG TOOLING FOR A COMPUTERIZED NUMERICALLY CONTROLLED LATHE

FIELD OF THE INVENTION

The present invention relates generally to a lathe and more specifically to a computerized numerically controlled lathe having a plurality of removable tools secured to a removable and interchangeable top plate carried by the lathe cross-carriage.

BACKGROUND OF THE INVENTION

Computerized numerically controlled (CNC) lathe is a highly accurate machine that can produce a part repeatedly automatically. Typically, gang tooling in the form of an indexing tool turret on the periphery of which is mounted a plurality of individual tools is provided. The turret can be rotated to bring each tool into operative position to perform a specific machining operation on a workpiece secured in a collet or chuck of the lathe. To bring a tool to an operative position, the turret is moved away from the main spindle, the clamping force on the turret is removed, the turret is then turned to position the tool, the turret is then clamped down, and the turret is moved toward the workpiece. Setup time is therefore involved when using an indexing turret, adding to the total time to machine a part.

The present invention provides a gang tooling that does away with an indexing turret and provides an extremely rigid gang tooling structure for highly accurate machining.

OBJECTS AND SUMMARY OF THE INVENTION

It is an object of the present invention to provide a removable and interchangeable top plate that can be set up with tooling for a range of jobs and then stored away for further job runs.

It is another object of the present invention to provide a removable and interchangeable top plate for rigidly securing a plurality of tools thereto.

It is an object of the present invention to provide a removable and interchangeable top plate that is non-indexing, thereby requiring no indexing time and requiring less time for setup and hence less time to manufacture a part.

It is another object of the present invention to provide a removable and interchangeable top plate that provides maximum structural rigidity and clamping of tools during machining operations.

It is still another object of the present invention to provide an interchangeable top plate that uses dovetail clamping and non-indexing, thereby providing a completely rigid machine structure for fine surface finishing and extremely close tolerance machining.

It is an object of the present invention to provide a top plate that can be removed and replaced quickly and repeatably within extremely low tolerances.

It is yet another object of the present invention to provide a top plate for holding a plurality of tools along a row transverse to the axis of rotation of the machine spindle.

It is yet another object of the invention to provide a top plate that secures a plurality of tools such that both sides of a work piece can be machined without reversing the main spindle.

It is an object of the present invention to provide a tool holder that clamps to a removable and interchangeable top plate.

It is yet another object of the present invention to provide a tool holder that can be removed from any location on the top plate without having to remove any other tool on the top plate.

It is an object of the present invention to provide a tool holder that can accommodate different shank sized tools by use of adjustable wedge and shim arrangement.

It is an object of the present invention to provide a live tool that is removably securable to the cross-slide of the machine and has face and cross working positions.

It is another object of the present invention to provide a live tool for tapping that prevents damaging the cut threads when backing out the tool.

It is still another object of the present invention to provide a live tool that has changeable speeds for specific machining operations.

In summary, the present invention provides a CNC lathe that has an interchangeable top plate gang tooling capabilities, including live tooling, and a rigid dovetail tooling system for extremely accurate machining capabilities.

These and other objects of the present invention will become apparent from the following detailed description.

DETAILED DESCRIPTION OF THE INVENTION

Figure 1:
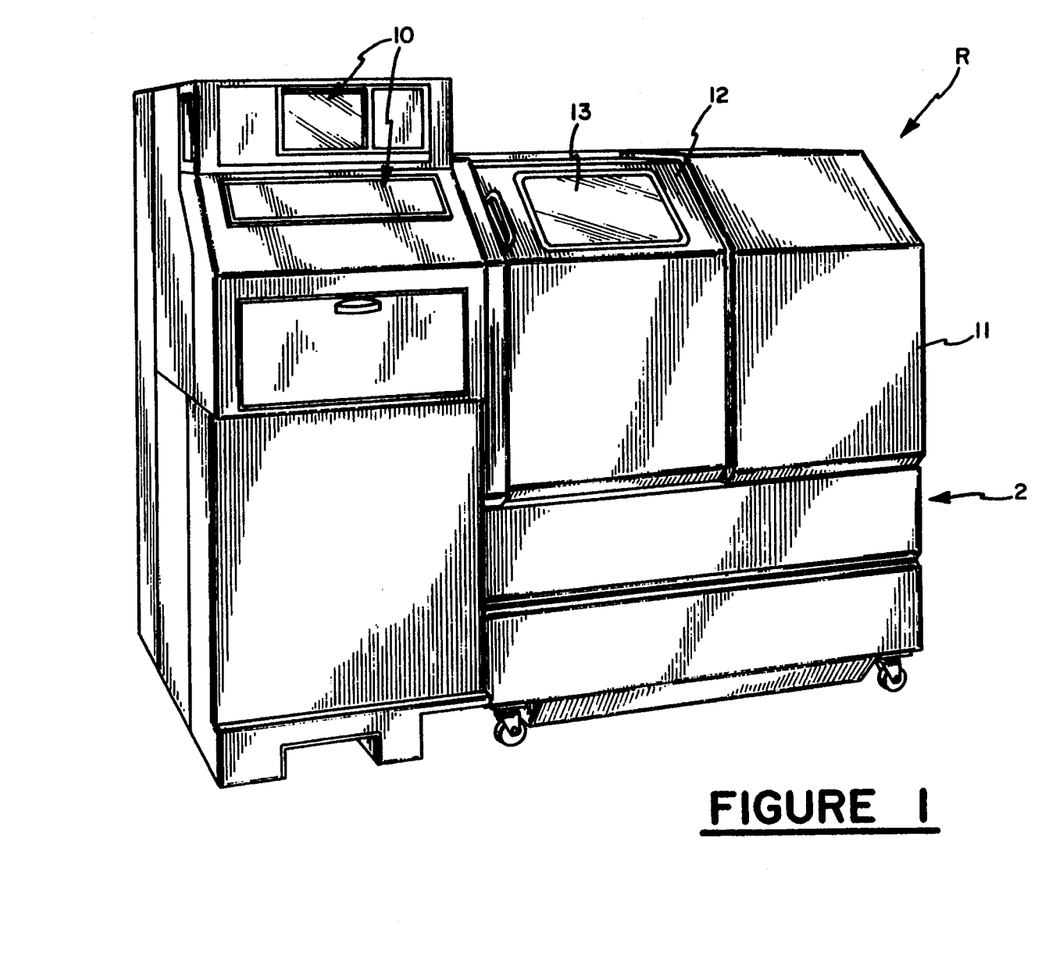
FIG. 1 is a front perspective view of a computerized numerically controlled lathe utilizing the present invention.
Figure 2:
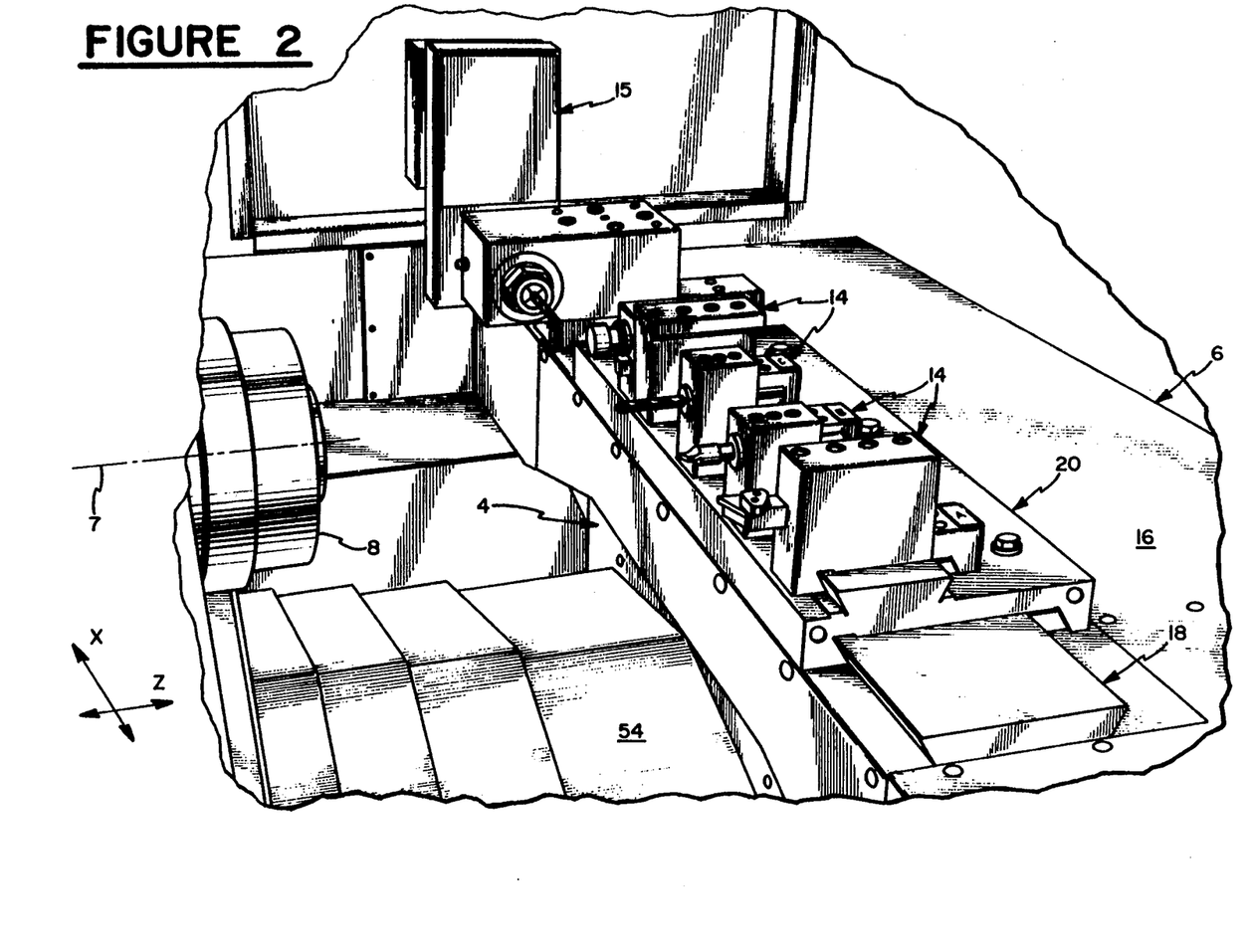
FIG. 2 is an enlarged front perspective view of a cross-slide of the machine of FIG. 1.

An embodiment of the present invention is disclosed as a computerized numerically controlled lathe R, as best shown in FIGS. 1 and 2, and comprises a frame 2, a longitudinal (z-axis) carriage 4, a cross-slide (x-axis ) 6 carried by the carriage 4, a spindle 8 with an axis of rotation 7 (shown in FIG. 2), and a control panel 10. The lathe R includes a housing 11 with a sliding door 12. A viewing window 13 is carried by the door 12 and provides means for an operator to observe a part being machined while the door 12 is closed. The carriage 4, the cross-slide 6 and the spindle 8 are located behind the door 12 and are easily accessible when the door 12 is open, as best shown in FIG. 2. The cross-slide 6 is directly positionable in the opening of the door 12.

The longitudinal carriage 4 is movable along a z-axis that is parallel to the axis of rotation 7 of the spindle 8. The cross-slide 6 is movable along an x-axis that is perpendicular to the z-axis and to the axis of rotation 7 of the spindle 8. By selective movements along the z and x-axis, a number of static tool holders generally indicated at 14 and at least a live tool 15 may be brought individually to a workpiece (not shown) secured in the spindle 8.

Figure 3:
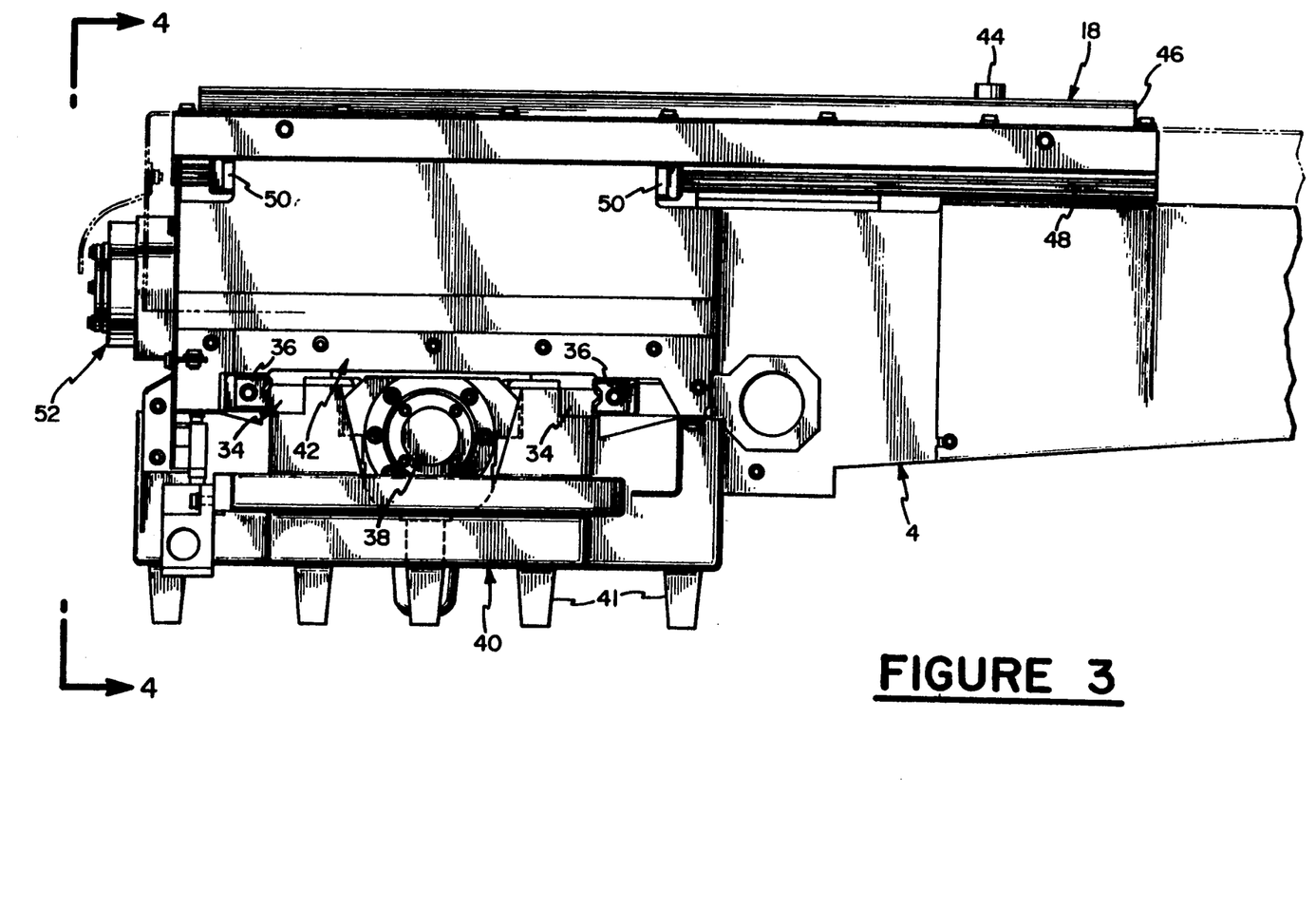
FIG. 3 is a right side elevational view of the cross-slide shown in FIG. 2, with top plate and tool holders deleted for clarity.
Figure 4:
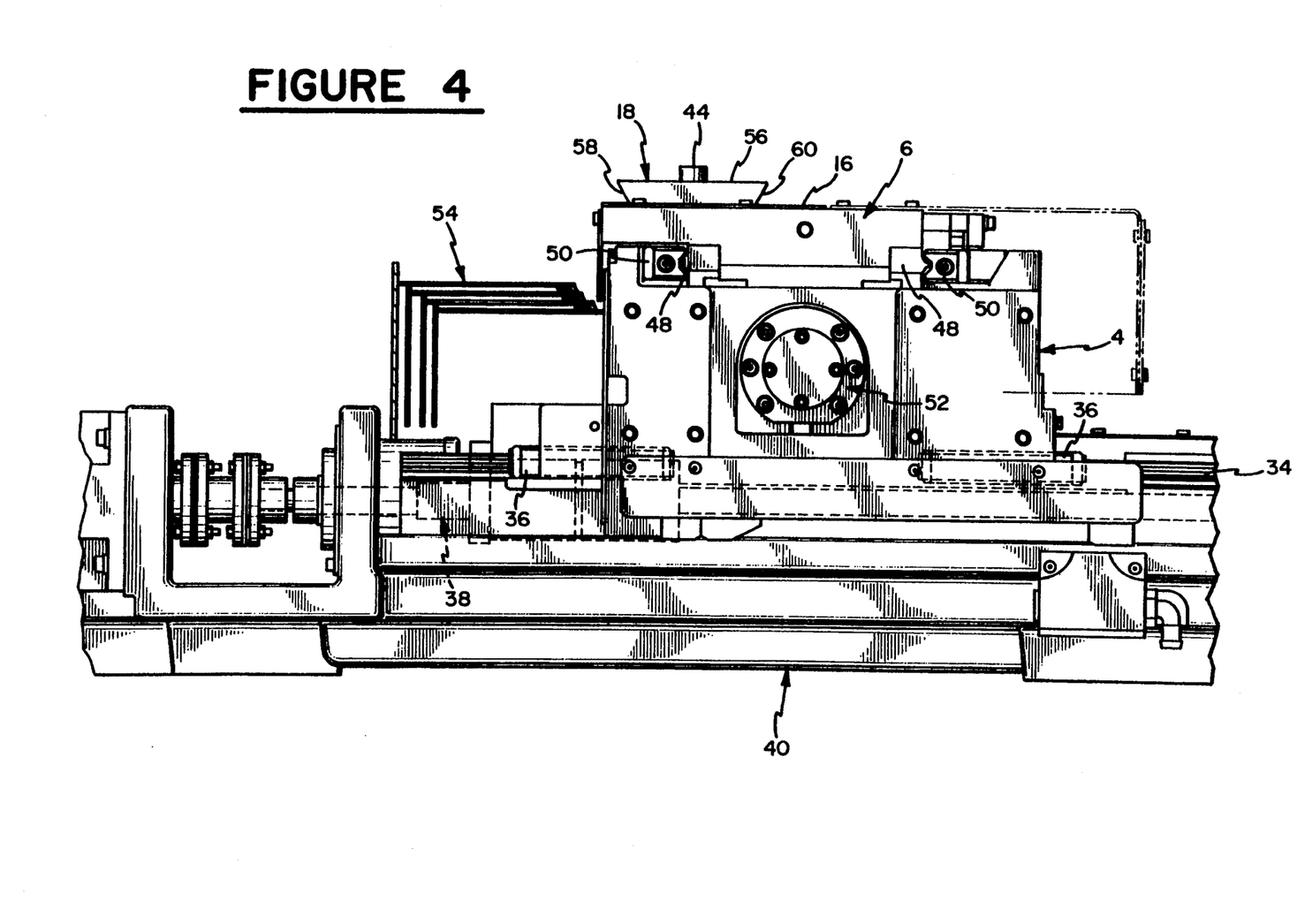
FIG. 4 is a front elevational view of the cross-slide shown in FIG. 3 as viewed along line 4—4 in FIG. 3.

The cross-slide 6 has a horizontal planar surface 16 from which projects a dovetail tenon 18, as best shown in FIGS. 2, 3 and 4. The dovetail tenon 18 is carried by the cross-slide 6, which is in turn carried by the longitudinal carriage 4 such that the dovetail tenon 18 moves along the z- and x-axes.

Figure 26:
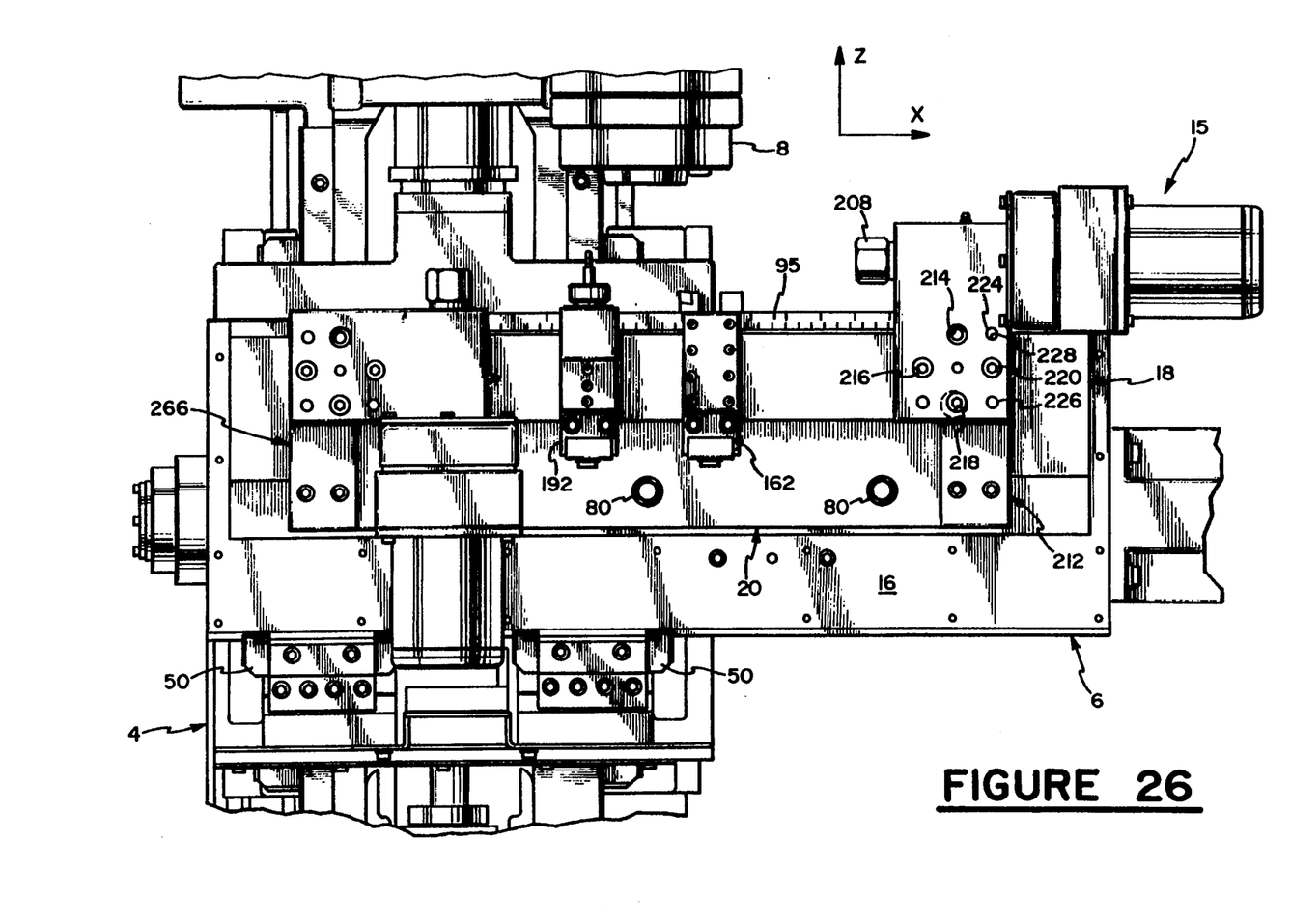
FIG. 26 is a top plan view of the cross-slide in FIG. 3, showing live tools secured at the front and at the rear and a number of static tool holders secured therebetween.

A top plate 20, as best shown in FIG. 2, is removably secured to the dovetail tenon 18 in a manner that will be described in detail below. The top plate 20 carries the plurality of static tool holders 14, each of which is removably secured to the top plate 20 as will be explained in greater detail below. The live tool 15 is disclosed as being removably secured to the rear portion of the dovetail tenon 18. The live tool 15 may also be secured at the front of the dovetail tenon 18, as best shown in FIG. 26. The live tool 15 will be discussed in greater detail below.

The longitudinal carriage 4 is supported by linear guideways 34 by means of bearing assemblies 36, as best shown in FIG. 3. A ball screw assembly 38, operably associated with a bed frame 40 and carriage frame 42, provides the means for moving the carriage 4 in the z-axis direction. Ribs 41 provide means for securing the bed frame 40 to a concrete base (not shown).

The cross-slide dovetail tenon 18 includes a stop dowel 44, which provides a stop means for the top plate 20 when it is installed on the cross-slide 6. The stop dowel 44 is disposed toward and spaced from the rear-end 46 of the dovetail tenon 18, as best shown in FIG. 3. The top plate 20 and the tools 14 and 15 are not shown in FIG. 3 for clarity.

The cross-slide 6 is supported by linear guideways 48 and bearing assemblies 50, as best shown in FIG. 4. A ball screw assembly 52, operably associated with the carriage 4 and the cross-slide 6, provides the means for translating the cross-slide 6 along the x-axis. Telescoping way cover 54 retracts and extends with the carriage 4 to keep debris, chips, coolant, etc. away from the linear guideways 34 disposed under it, as best shown in FIG. 4.

The dovetail tenon 18 has a top surface 56 and inclined side surfaces 58 and 60, as best shown in FIG. 4. The dovetail tenon 18 cooperates with the top plate 20, as best shown in FIG. 2.

Figure 5:
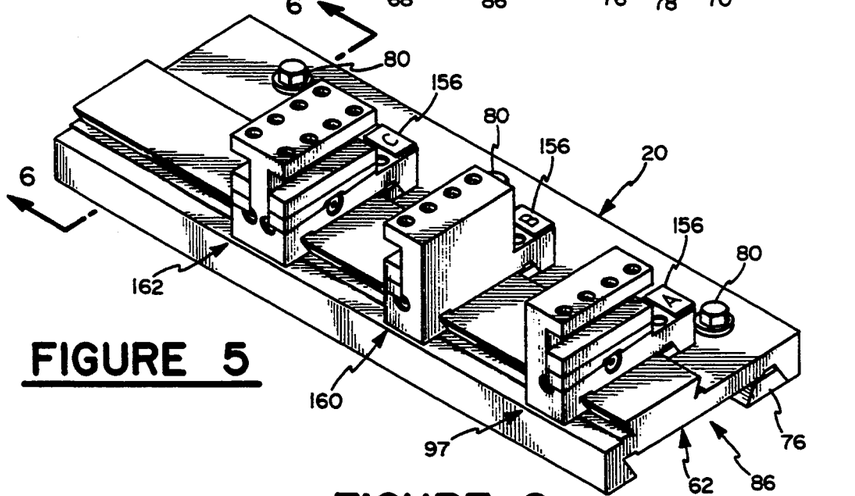
FIG. 5 is a perspective view of a gang tooling top plate.
Figure 6:
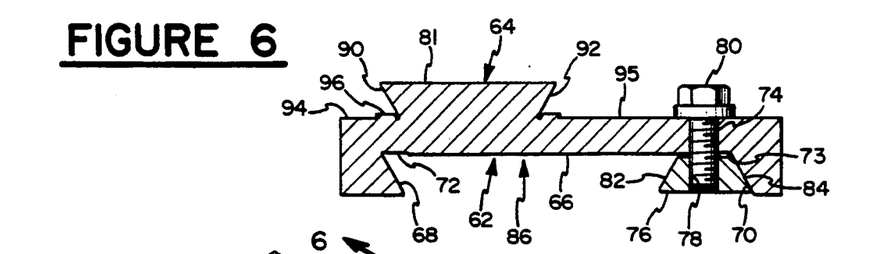
FIG. 6 is a cross-sectional view taken along line 6—6 in FIG. 5.

The top plate 20 has a downwardly disposed recess 62 and an upwardly disposed dovetail tenon 64, as best shown in FIGS. 5 and 6. The slot 62 is defined by a horizontal surface 66, an inwardly inclined surface 68 and an opposite outwardly inclined surface 70. The surface 66 has relief depressions 72 and 73 adjacent the respective surfaces 68 and 70 and running the length of the top plate 20, as best shown in FIG. 6. A plurality of holes 74 are disposed adjacent the right side of the top plate 20, as best shown in FIG. 6. A wedge 76 with threaded holes 78 are associated with respective bolts 80 that are held in the holes 74. The wedge 76 has a cross-sectional shape of a trapezoid with incline surfaces 82 and 84, as best shown in FIG. 6. The surfaces 66 and 68 of the top plate 20 and the surface 82 of the wedge 76 form a dovetail mortise 86 that cooperates with the top plate dovetail tenon 18 when the top plate 20 is secured to the cross line 6, as best shown in FIG. 2. Thus, the corresponding surfaces of the dovetail tenon 18 and the top plate mortise 86 are substantially parallel to and in engagement with each other.

The dovetail tenon 64 has a top surface 88 and opposite inclined surfaces 90 and 92 extending downwardly and inwardly from the top surface 88, as best shown in FIG. 6. The dovetail tenon 64 cooperates with the tool holders 14 in a manner that will be fully described below.

The top plate 20 has a recess 94 for securing a ruler or marker 95 (shown in FIG. 26) such that the top surface of the ruler will be even with or below a surface 96 of the top plate 20 in order to prevent any interference between the ruler 95 and any of the tool holders 14 when being installed to the mortise tenon 64. A similar recess 97 is disposed on the other side of the tenon 64 for installation of another ruler or marker, if desired, without interfering with the tool holders 14 that will be secured to the tenon 64, as best shown in FIG. 6.

The top plate 20 is removably secured to the dovetail tenon 18, as best shown in FIG. 2. The wedge 76 is loosened by turning each of the bolts 80 a quarter turn in the counter-clockwise direction to permit the top plate 20 to be slid through the dovetail tenon 18. After the top plate 20 engages the stop dowel 44, the bolts 80 are then tightened counter-clockwise a quarter turn, bringing up the wedge 76 upwardly against the surface 60 of the dovetail tenon 18 and the surface 70 of the top plate 20, thereby to lock the top plate 20 to the dovetail tenon 18, as best shown in FIG. 2.

Figures 7, 8:
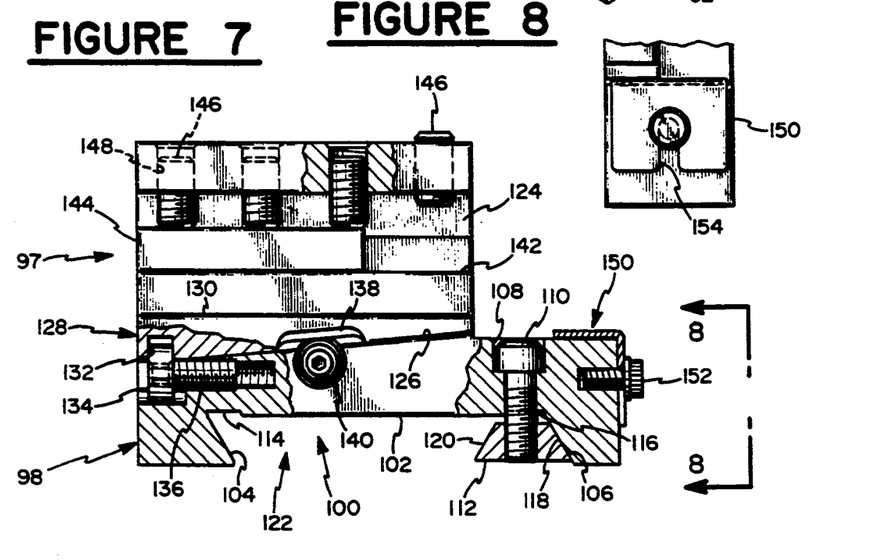
FIG. 7 is a side elevational view, with portions broken away and shown in cross-section, of a tool holder.
FIG. 8 is an enlarged fragmentary end view of the tool holder viewed along lines 8—8 in FIG. 7.
Figure 9:
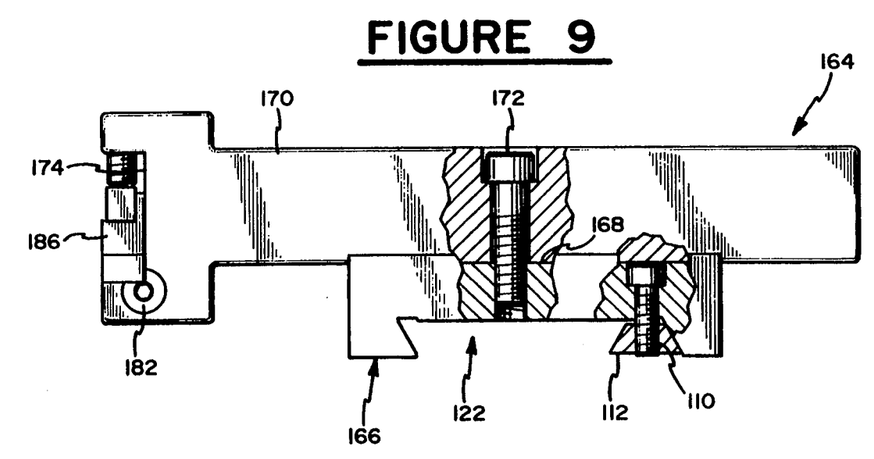
FIG. 9 is a side elevational view of another tool holder, with portions broken away and shown in cross-section.
Figure 10:
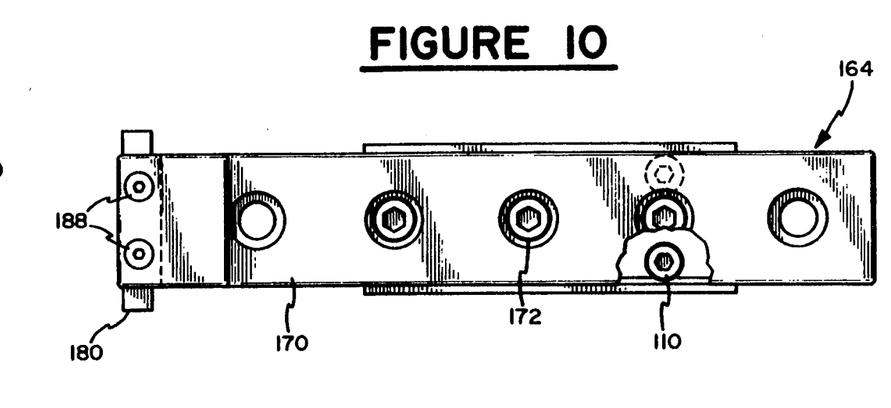
FIG. 10 is a top plan view of the tool holder in FIG. 9.

An embodiment of the tool holder 14 is disclosed in FIG. 7 as a square shank left hand tool holder 97. The tool holder 97 includes a rigid body 98 having a recess 100 disposed underneath and comprises a horizontal surface 102, an inwardly inclined surface 104 and an opposite outwardly inclined surface 106. The body 98 has a pair of holes 108 for accepting respective socket head screws 110 that hold a trapezoidal wedge 112 within the recess 100. The slot 100 has a relief depression 114 and 116 disposed along the respective intersection of surface 102 with the inclined surfaces 104 and 106. The wedge 112 has an inclined surface 118 that engages the surface 106 when the wedge 112 is forced upwardly by the screws 110. The wedge 112 also has an inclined surface 120 that cooperates with the surfaces 100 and 104 to form a dovetail mortise 122 that mates with the dovetail tenon 64 on the top plate 20, as best shown in FIGS. 2 and 5.

The tool holder 97 has a longitudinal axis that is disposed transversely to the longitudinal axis of the top plate 20 when installed thereon, as best shown in FIG. 5. The body 98 has a slot or opening 124 that is parallel to this longitudinal axis. The slot 124 has a ramp surface 126 on which is disposed a wedge 128 with a top surface 130 that is horizontal and parallel to the surface 102 of the dovetail mortise 122. A slot 132 in the wedge 128 receives the head 134 of a socket screw 136 that is threadly secured in the body 98, as best shown in FIG. 8. Rotation of the socket screw 136 causes corresponding inward or outward movement of the wedge 128, thereby raising or lowering the surface 130. A spring plate 133 secured by a socket screw 140 holds the wedge 128 in place. A shim 142 provides gross height adjustment for a cutting bit 144. The movable wedge 128 provides fine height adjustment for the bit 144. A plurality of socket head set screws 146 secured in corresponding threaded holes 148 are used to clamp the cutting bit 144 in place, as best shown in FIG. 7.

A tool marker 150 is secured to the body 98 by a thumb screw 152 via a slot 154, as best shown in FIG. 8. The tool marker 150 has indicia 156 that provides positive identification to each of the tool holders 14 and its position relative to the longitudinal axis of the top plate 20 and the x-axis of the cross-slide 6, as best shown in FIG. 5.

An embodiment of a square shank right hand tool holder 160 is disclosed in FIG. 5 and is similar to the tool holder 97 disclosed in FIG. 7, except that the slot or opening 124 is disposed on the right hand side of the tool holder body 98. An embodiment of a double square shank tool holder 162 is disclosed in FIG. 5 and is a combination of the tool holders 97 and 160 disclosed in FIGS. 5 and 7, and includes left hand and right hand slots 124.

Figure 11:
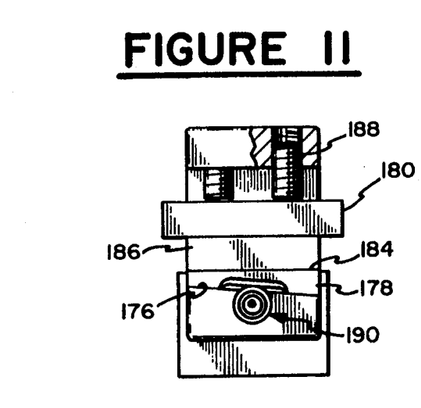
FIG. 11 is a left side elevational view of the tool holder in FIG. 9, with portions broken away and shown in cross-section.
Figure 12:
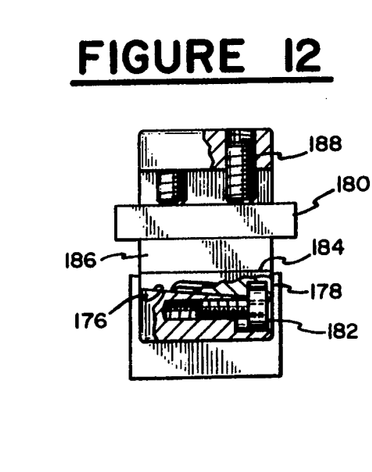
FIG. 12 is a left side elevational view of the tool holder in FIG. 9 with portions broken away and in cross-section.

An embodiment of a cut-off tool holder 164 is disclosed in FIGS. 9–12. The tool holder 164 comprises a removable base 166 that has the dovetail mortise 122 and the wedge 112, as in the tool holder 97 disclosed in FIG. 7. The base 166 has a longitudinal slot 168 on its top portion upon which is secured a member 170 by means of socket head screws 172. At one end of the member 170 is an opening 174 disposed transversely to the member 170 and comprises a ramp surface 176 that cooperates with a wedge 178 to provide height adjustment to a tool bit 380, as best shown in FIGS. 11 and 12. An adjusting socket head screw 182 raises or lowers the top surface 184 of the wedge 178, in a manner similar to that described for the tool holder 97 in FIG. 7. A "L"-shaped shim 186 provides gross height adjustment for the tool bit 180. Socket head set screws 188 clamp the tool bit 180 in place. Socket screw and spring assembly 190 secures the wedge 178 in place relative to the ramp surface 176 after adjustment has been done.

Figure 13:
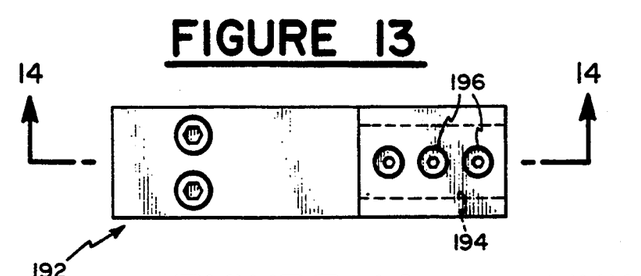
FIG. 13 is a top plan view of another tool holder.
Figure 14:
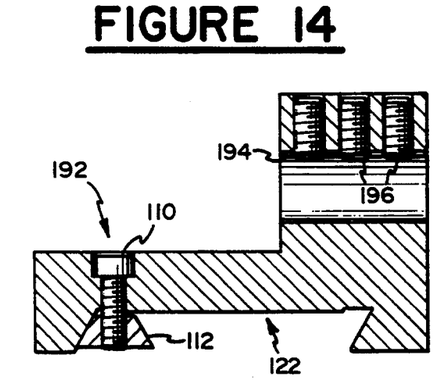
FIG. 14 is a cross-sectional view along line 14—14 of the tool holder in FIG. 13.
Figure 15:
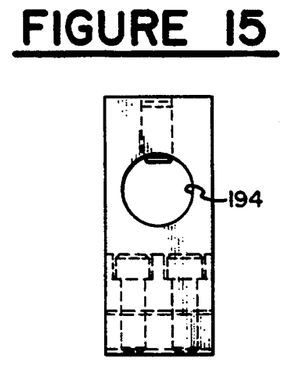
FIG. 15 is a front elevational view of the tool holder in FIG. 14.

An embodiment of a round shank tool holder 192 is disclosed in FIGS. 13–15. The tool holder 192 includes the dovetail mortise 122 for securing to the top plate 20. The tool holder 192 has a round opening 194 for receiving the round shank of a tool bit, such as drill bit (not shown). Socket set screws 196 protrudes through the opening 194 to hold the round shank portion of the tool bit (not shown) in place.

Figure 16:
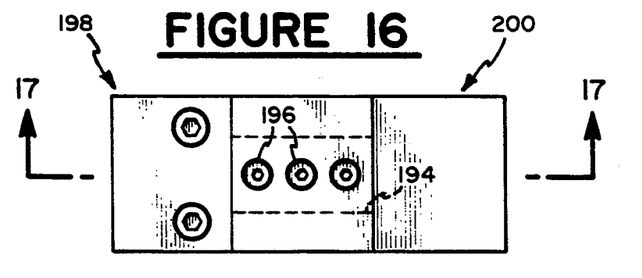
FIG. 16 is a top plan view of another tool holder.
Figure 17:
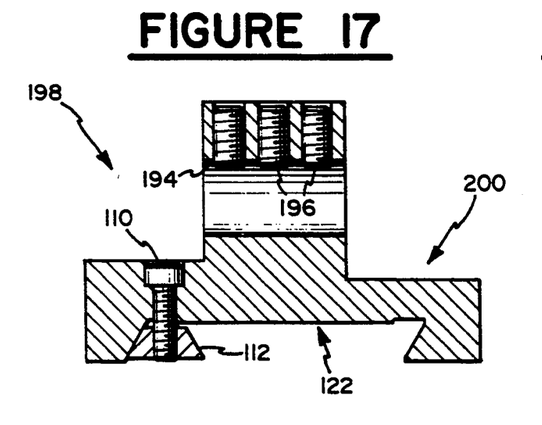
FIG. 17 is a cross-sectional view along line 17—17 of the tool holder in FIG. 16.
Figure 18:
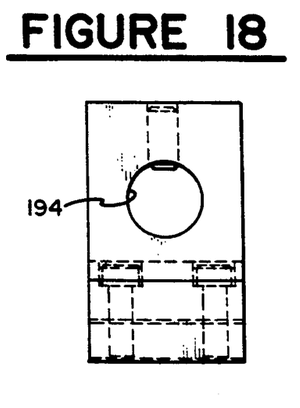
FIG. 18 is a front elevational view of the tool holder in FIG. 17.

Another embodiment of a round shank tool holder 198 is disclosed in FIGS. 16–18, and is similar to the tool holder 192. The tool holder 198 has a z-axis off-set 200.

Figure 19:
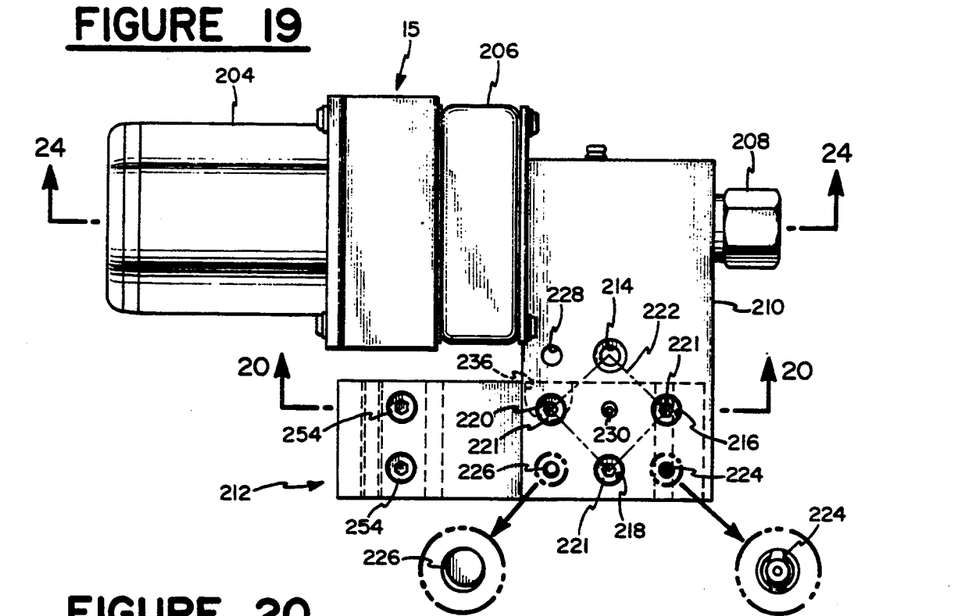
FIG. 19 is a top plan view of a live tool configured for mounting in the rear of the cross-slide in FIG. 2.
Figure 20:
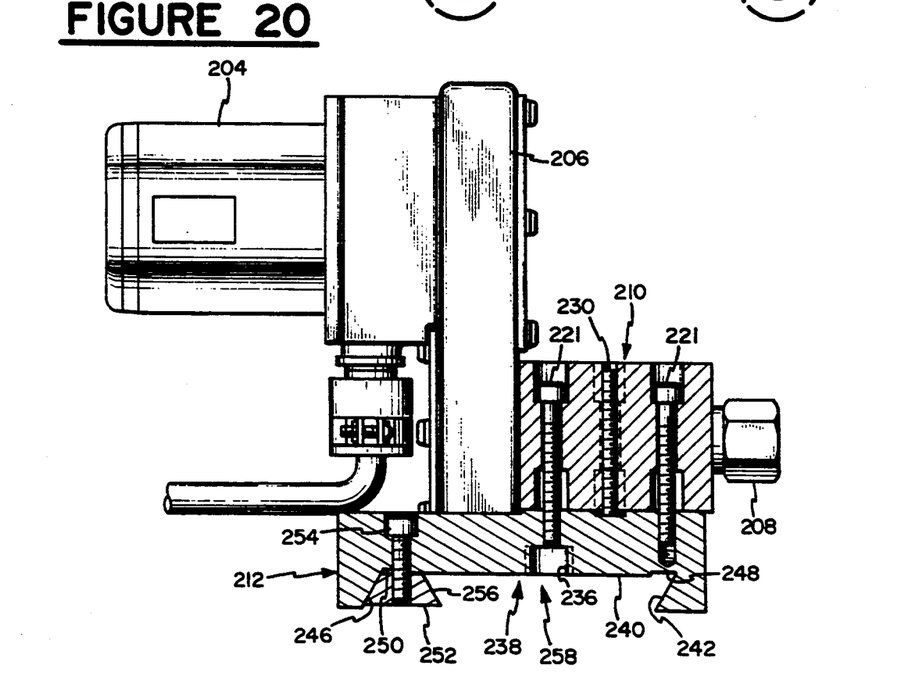
FIG. 20 is a cross-sectional view along line 20—20 of the tool holder in FIG. 20.
Figure 23:
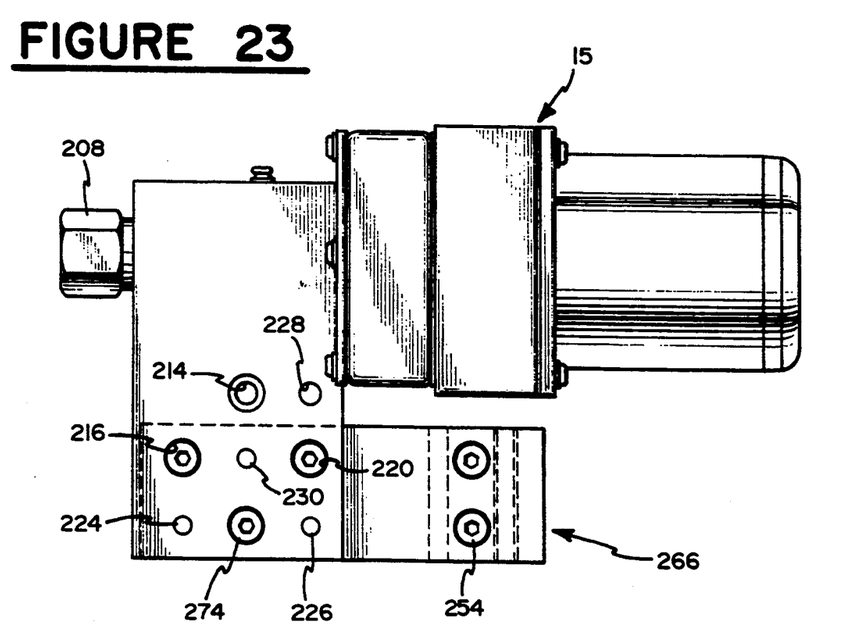
FIG. 23 is a top plan view of the live tool in FIG. 19 configured for mounting in the front of the cross-slide in FIG. 2.
Figure 24:
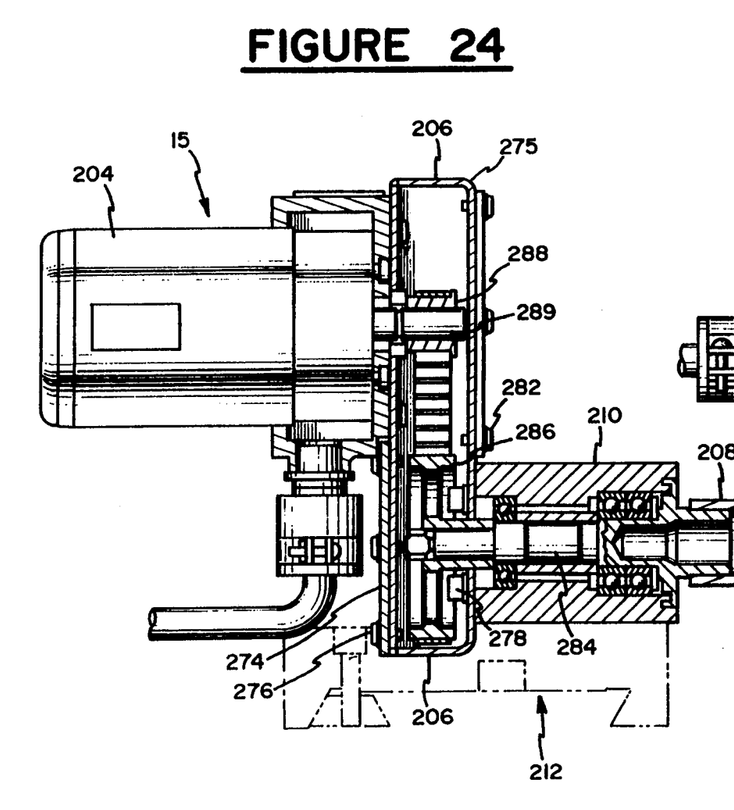
FIG. 24 is a cross-sectional view along line 25—25 of the live tool in FIG. 19.

An embodiment of the live tool 15 is disclosed in FIGS. 19, 20 and 24. The live tool 15 includes a motor 204, a power transmission means 206, a bit holder 208, a base 210, and a rear mounting block 212. The base 210 has a group of four holes 214, 216, 218 and 220 and respective socket head screws 221 that are arrayed in a diamond-like configuration 222, as best shown in dashed lines in FIG. 19. Any three consecutive holes 214, 216, 218 and 220 form a triangular pattern that are congruent to each other and disposed at 90 degree orientation. The holes 214, 216, 218 and 220 are used to orient the live tool 15 in either a face working position at the front or the rear of the cross-slide 6 or in a cross-working position at the rear portion of the cross side 6. The tool 15 as configured in FIG. 19 is in the face-working position for securing at the rear end of the cross-slide 6. The live tool 15 configured in FIG. 23 is also in the face-working position for securing at the front end of the cross-slide 6.

A diamond dowel 224 and a pin dowel 226 provides means for positioning the base 210 (and hence the, live tool 15) in either the face-working or cross-working position such that the axis of rotation of the bit holder 208 is precisely parallel or transverse to the axis of rotation 7 of the main spindle 8. The mounting block 212 is used only at the rear end portion of the dovetail 18.

Figure 21:
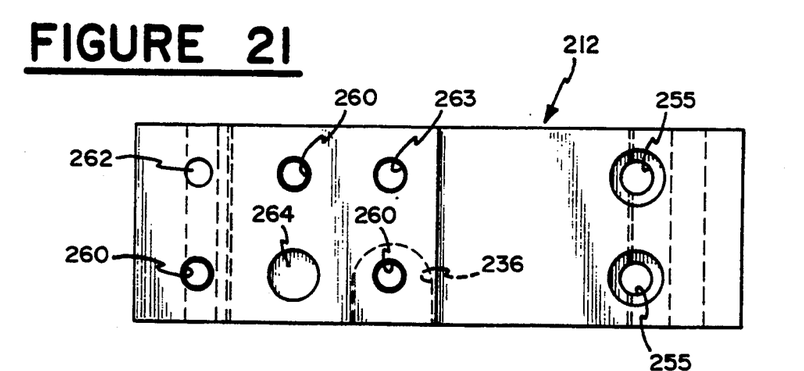
FIG. 21 is an enlarged top plan view of a rear mounting block for the live tool in FIG. 19.

Hole 208 receives the diamond dowel 224 when the live tool 15 is positioned in the cross-working, as best shown in FIG. 26. The holes 214, 218 and 220 with respective screws 221 are used when the live tool 15 is in the cross-working position. Jacking screw 230 is used to separate the base 210 from the mounting block 212 when reconfiguring the orientation of the live tool 15 from one of the two working positions to the other working position. Socket head screws 232 secure the live tool 15 to the mounting block 212, as best shown in FIG. 21. Recess 236 is designed to receive the stop dowel 44 in the dovetail tenon 18 when the mounting block 212 is secured thereto, thereby permitting the mounting block 212 to engage the end portion of the top plate 20.

The mounting block 212 has a recess 238 disposed downwardly and defined by a horizontal surface 240, an inwardly inclined surface 242 and an opposite outwardly inclined surface 246, as best shown in FIG. 20. Relief depressions 248 and 250 are each disposed in respective intersections of the surface 240 and the inclined surfaces 242 and 246. A trapezoidal wedge 252 is secured by a pair of socket head screws 254 at one end of the recess 238 having the outwardly inclined surface 246. The screws 254 are received in corresponding holes 255. The wedge 252 has an inclined surface 256 that defines a dovetail mortise 258 with the surfaces 240 and 242. The dovetail mortise 258 cooperates with the dovetail tenon 18 off the cross-slide 6 in the same way as the rod plate dovetail mortise 86 does. The live tool 15 is secured to the cross-slide dovetail tenon 18 by loosening and then tightening the wedge 252.

A top plan view of the rear mounting block 212 is disclosed in FIG. 21. Threaded holes 260 cooperate with the screws 221 to secure the base 210 to the mounting block 212. The holes 260 form a triangular pattern that is congruent with any one of the triangular patterns formed by any three consecutive holes 214, 216, 218 and 220. Hole 262 receives the diamond dowel 224 and hole 263 the pin dowel 226. Recess 264 cooperates with the jacking screw 230 to provide a support surface when the screw 230 is threaded in to separate the base 210 from the mounting block 212. The rear mounting block 212 secures the live tool 15 in the face or cross-working position at the rear portion 46 of the dovetail tenon 18, as best shown in FIG. 26.

Figure 22:
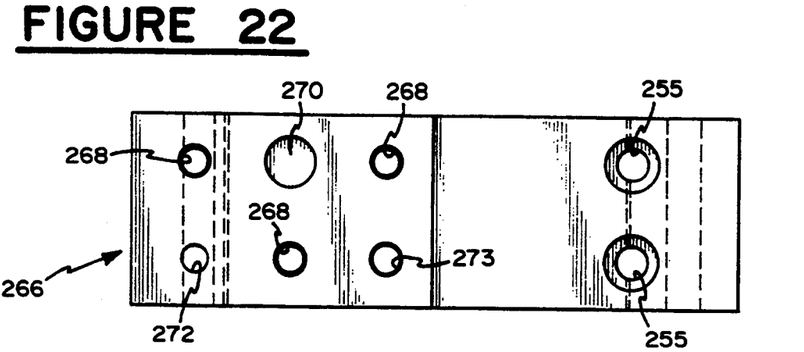
FIG. 22 is an enlarged top plan view of a front mounting block for the live tool.

A front mounting block 266, similar to the rear mounting block 212, is disclosed in FIG. 22. Threaded holes 268 cooperate with the screw 221 to secure the base 210 to the mounting block 266. Recess 270 cooperates with the jacking screw 230. Hole 272 is used to receive the diamond dowel 224 and hole 273 pin dowel 226. The socket heads screws 254 received in the holes 255 and cooperating with the wedge 252 secure the front mounting block 266 to the front end portion of the dovetail tenon 18. The live tool 15 then bolts to the mounting block 266, as best shown in FIG. 26.

A top plan view of the cross-slide 6 with the top plate 20 secured thereto and the tool holders 162, 192 and 202 is disclosed in FIG. 26. The live tool 205 at the rear of the cross-slide 6 is configured in a cross working position while the live tool 15 at the front of the cross-slide 6 is configured in a face working position.

The transmission 206 comprises a housing 273 with a cover 274 removably secured thereto with screws 276. When the cover 274 is removed, access is then gained to screws 278 that secures housing 273 to the base 210, as best shown in FIG. 24. With the screws 278 removed, the base 210 may then be rotated about spindle 284, after screws 282 are removed to provide clearance, to convert the live tool 15 from the configuration shown in FIG. 19 to the configuration shown in FIG. 23 for mounting to the front of the cross-slide 6 for the face working position, as best shown in FIG. 26.

Pulleys 286 axed 288 secured to the spindle 284 and shaft 289, respectively, are replaceable with different sizes for varying the speed of the spindle 184. The shaft 289 is disposed parallel to the spindle 284, as best shown in FIG. 24.

Figure 25:
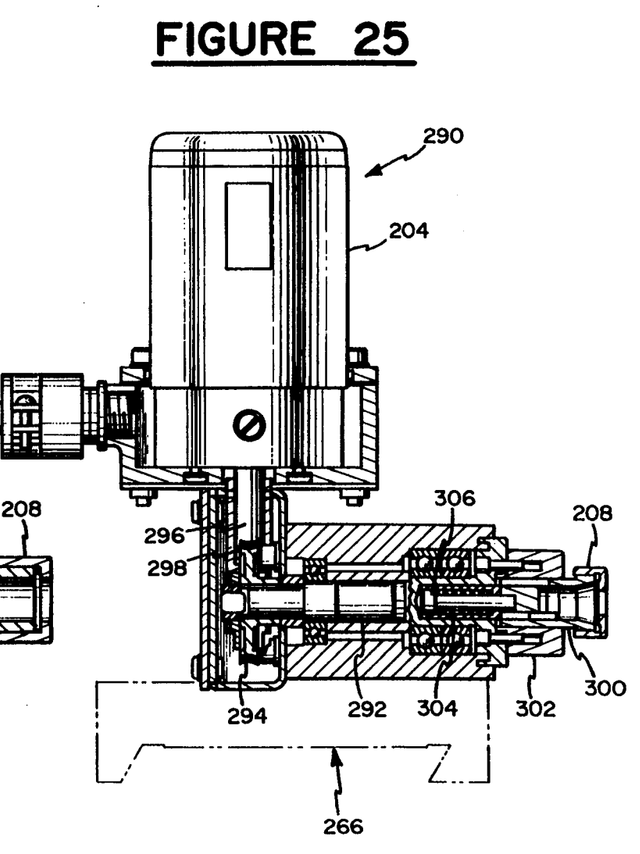
FIG. 25 is a cross-sectional view of a live tool for tapping.

Another embodiment of a live tool 290 for tapping holes in a workpiece is disclosed in FIG. 25. The live tool 290 comprises a spindle 292 driven by the motor 204 via a worm gear 294 operably connected to the spindle 292. The worm gear 294 is driven by the motor shaft 296 through a shaft-worm gear adapter 298. The shaft 296 is disposed transversely to the spindle 292. The spindle 292 has a sliding portion 300 movable within a sleeve 302. A spring 304 disposed around a socket head screw 306 biases the portion 300 inwardly toward the spindle 292.

The sliding portion 300 prevents the tapping bit (not shown), when being backed out from the workpiece (not shown) after a tapping operation, from cutting the threads that were just made. If the backout speed is too much, the sliding portion 300 moves out relative to the sleeve 302.

OPERATION

In operation, the top plate 20 is set up with plurality of static tool holders 14, depending on the part to be made. The bolts 80 are loosened so that the wedge 76 is loose. The top plate 20 is then slid into the dovetail tenon 18 until it engages the stop dowel 44. The top plate 20 is then secured in place by tightening the bolts 80, thereby drawing up the wedge 76 in locking engagement with the dovetail tenon 18, as best shown in FIG. 2. The wedge 76 advantageously pulls the top plate 20 against the side surface 58 of the dovetail tenon 18, thereby aligning the top plate 20 against a common reference. The stop dowel 44 advantageously provides for positioning repeatability within very tight tolerances so that the top plate 20 can be removed and later reinstalled without disturbing the tool holders 14 sectored thereto and with complete assurance that the top plate 20 and the tool holders 14 will be in the same position as before when repositioned on the cross-slide 6. A number of the top plate 20 can be advantageously setup for different parts that require different tools, thereby saving time in setup when machining different parts.

The tool holders 14 are normally secured to the top plate 20 before it is installed on the cross-slide 6. The wedge 112 pulls the tool holder 14 against the surface 90 of the dovetail tenon 64, thereby aligning all the tool holders 14 against a common reference.

While the top plate 20 is secured to the dovetail tenon 18, any of the tool holders 14 may be removed or installed without disturbing any adjacent tool holder 14. The socket head screws 110 are loosened completely to separate the wedge 112. The tool holder 14 can then be lifted up.

The live tools 15 and 290 are secured to the dovetail tenon 18 at the front and/or the rear. Preferably, the live tool 15 is installed at the front of the cross-slide 6 after the top plate 20 has been secured to the dovetail tenon 18. The mounting block 266 is used to secure the live tool 15 or 290 at the front while the mounting block 212 is used to secure the live tool 15 at the rear, as best shown in FIG. 26.

While this invention has been described as having preferred design, it is understood that it is capable of further modification, uses and/or adaptations of the invention following in general the principle of the invention and including such departures from the present disclosure as come within known or customary practice in the art to which the invention pertains and as may be applied to the essential features set forth and fall within the scope of the invention or the limits of the appended claims.

We claim:

1. A gang tooling for a machine tool having a main spindle with an axis of rotation, a longitudinal carriage movable along a z-axis parallel to the main spindle axis and cross-slide carried by the longitudinal carriage and movable along a x-axis transverse to the main spindle axis, said gang tooling comprising:

longitudinal plate;

first means for removably securing said plate to the cross-slide such that said plate is transversely disposed relative to the main spindle axis when secured to the cross-slide;

a plurality of tool holders removably secured to said plate along a row, second means for removably securing said plurality of tool holders to said plate along the row such that each of the tool holders is individually removably secured to any one of a plurality of adjustable longitudinal positions along said plate;

said first means cooperating with the cross-slide such that said plate can be removed from the cross-slide without disturbing and removing the tool holders installed on said plate, thereby permitting the tool holders to remain secured to said plate at their original relative positions.

2. A gang tooling as in claim 1, wherein:
a) said first means includes a recess in said plate for cooperating with a projection on the cross-slide; and
b) means for locking said plate to the cross-slide projection.

3. A gang tooling as in claim 2, wherein:
a) said recess is disposed downwardly and includes a top wall and first and second inclined opposite walls extending from said top wall; and
b) said first and second walls are inclined inwardly into and outwardly from said recess, respectively.

4. A gang tooling as in claim 3, wherein:
a) said locking means includes a wedge disposed within said recess along said second wall; and
b) said wedge is tapered downwardly from narrow to wide.

5. A gang tooling as in claim 4, wherein:
a) said wedge includes a third surface inclined downwardly into said recess and a fourth surface inclined outwardly downwardly from said recess; and
b) said wedge fourth surface cooperates with said recess second surface.

6. A gang tooling as in claim 5, wherein:
a) said wedge third surface cooperates with said recess top wall and said first surface for defining a dovetail mortise adapted to fit into a dovetail tenon disposed in the cross-slide.

7. A gang tooling as in claim 2, wherein:
a) said plate includes a longitudinal projection extending upwardly therefrom for securing at least one tool holder.

8. A gang tooling as in claim 7, wherein:
a) said plate projection includes a top surface and fifth and sixth surfaces extending inwardly therefrom.

9. A gang tooling as in claim 7, wherein:
a) said plate projection is a dovetail tenon in cross-section.

10. A gang tooling as in claim 7, wherein:
a) said plate recess and projection are disposed along a line parallel to the cross-slide projection.

11. A gang tooling as in claim 1, wherein:
a) each of said tool holders includes a recess disposed downwardly;
b) said tool holder recess includes a tool holder top wall and a tool holder first and second inclined opposite walls extending from said tool holder top wall;
c) said tool holder first and second walls are inclined inwardly into and outwardly from said tool holder recess, respectively; and
d) a wedge disposed within said tool holder recess.

12. A gang tooling as in claim 1, wherein:
a) each of said tool holders includes a body;
b) means for securing a tool bit to said body;
c) said body includes a recess disposed downwardly and including a top wall and first and second opposite side walls extending from said top wall;
d) said first and second side walls extends inwardly into and outwardly from said recess, respectively;
e) a clamping member disposed within said recess and movable between locked and unlocked positions for removably securing said body to the plate; and
f) means for actuating said clamping member into one of said locked and unlocked positions and for releasing said clamping member from said recess, thereby to permit said body to be lifted from the plate.

13. A gang tooling as in claim 12, wherein:
a) said clamping member is a wedge.

14. A gang tooling as in claim 13, wherein:
a) said wedge has a first surface disposed inwardly into said recess and a second surface cooperating with said recess second surface.

15. A gang tooling as in claim 12, wherein:
a) each of said tool holders includes means for positioning the tool bit at a preselected height.

16. A gang tooling as in claim 13, wherein:
a) said wedge is trapezoidal in cross-section.

17. A gang tooling as in claim 12, wherein:
a) said recess and said wedge defines a dovetail mortise.

18. A gang tooling as in claim 12, wherein:
a) said tool bit securing means includes an opening; and
b) clamping means for securing the tool bit within said opening.

19. A gang tooling as in claim 18, wherein:
a) said opening includes a ramp surface; and
b) a wedge having a horizontal surface and a ramp surface engaging said opening ramp surface such that said horizontal surface changes height as said wedge member is moved along said opening ramp surface.

20. A gang tooling as in claim 19, wherein:
a) said wedge includes a slot;
b) a threaded member having a flange operably associated with said slot;
c) said body includes a threaded hole operably associated with said threaded member;
d) whereby axial movement of said member within said threaded hole causes said wedge to move therewith.

21. A gang tooling as in claim 19, and further comprising:
a) means for locking said wedge.

22. A gang tooling as in claim 12, and further comprising:
a) removable identification tag disposed on said body.

23. A gang tooling as in claim 18, wherein:
a) said opening is circular in cross-section.

24. A gang tooling as in claim 18, wherein:
a) said opening is "C"-shaped.

25. A gang tooling as in claim 18, wherein:
a) said opening is parallel to the main spindle axis when secured to the cross-slide.

26. A gang tooling as in claim 18, wherein:
a) said opening is transverse to the main spindle axis when secured to the cross-slide.

27. A gang tooling as in claim 12, wherein:
a) said body includes first and second parts removably secured to each other.

28. A gang tooling as in claim 27, wherein:
a) said opening is transverse to the main spindle axis.

29. A gang tooling as in claim 12, wherein:
a) said body includes an offset recess along the z-axis.

30. A machine tool, comprising:
a bed;
a main spindle disposed on said bed, said spindle having an axis of rotation;
a first carriage operably associated with said bed and movable along a z-axis parallel to said spindle axis;
a second carriage carried by said first carriage and movable along a x-axis perpendicular to said z-axis;
a longitudinal plate disposed parallel to said x-axis when secured to said second carriage;
a plurality tool holders removably securable to any one of a plurality of adjustable positions along said plate;
first means operatively associated with said plate for individually removably securing said tool holders to any one of a plurality of adjustable longitudinal positions along said plate; and
second means cooperating between said plate and said second carriage for removably securing said plate to said second carriage such that said top plate can be removed from said second carriage while maintaining and without first removing said tool holders installed on said plate.

31. A machine tool as in claim 30, and further comprising:
a) a housing including a door; and
b) said second carriage is positionable in front of said door, thereby to permit removal and installation of said plate.

32. A machine tool as in claim 30, wherein:
a) said second means comprises a projection disposed on said second carriage;
b) said plate includes a recess cooperating with said projection; and
c) means for locking said top plate to said projection.

33. A machine tool as in claim 32, wherein:
a) said projection has a longitudinal axis transverse to said main spindle axis of rotation.

34. A machine tool as in claim 32, wherein:
a) said recess is disposed downwardly and includes a top wall and first and second inclined opposite walls extending from said top wall; and
b) said first and second walls are inclined inwardly into and outwardly from said recess, respectively.

35. A machine tool as in claim 32, wherein:
a) said locking means includes a wedge disposed within said recess along said second wall; and
b) said wedge is tapered downwardly from narrow to wide.

36. A machine tool as in claim 35, wherein:
a) said wedge includes a first surface inclined downwardly into said recess and a second surface inclined outwardly downwardly from said recess; and
b) said wedge second surface cooperates with said recess second surface.

37. A machine tool as in claim 36, wherein:
a) said projection is a dovetail tenon; and
b) said wedge first surface cooperates with said recess top wall and said recess first surface for defining a dovetail mortise adapted to fit into said dovetail tenon.

38. A machine tool as in claim 30, wherein:
a) said first means includes a longitudinal projection extending upwardly.

39. A machine tool as in claim 38, wherein:
a) said longitudinal projection includes a top surface and first and second opposite surfaces extending inwardly therefrom.

40. A machine tool as in claim 38, wherein:
a) said longitudinal projection is a dovetail tenon in cross-section.

41. A machine tool as in claim 30, wherein:
a) said first means includes a dovetail tenon;
b) said second means includes dovetail mortise disposed in said plate and a cooperating dovetail tenon disposed in said second carriage; and
c) said first means dovetail tenon and said second means dovetail mortise and said second carriage dovetail tenon are disposed longitudinally along the same line.

42. A machine tool as in claim 30, wherein:
a) said at least one tool holder includes an opening disposed downwardly and including a top wall and first and second inclined opposite walls extending from said top wall;
b) said first wall and second walls are inclined inwardly into outwardly from said opening, respectively; and
c) a wedge disposed within said opening.

43. A machine tool as in claim 30, and further comprising:
a) at least one live tool removably secured to said second carriage.

44. A machine tool as in claim 32, wherein:
a) said second carriage projection includes a stop means for insuring that said plate is installed to said second carriage at the same position every time said plate is reinstalled.

45. A machine tool as in claim 30, and further comprising:
a) telescoping way covers operably associated with said bed and said first carriage.

46. A machine tool as in claim 30, and further comprising:
a) a live tool including a base;
b) tool spindle operably associated with said base, said tool spindle having an axis of rotation;
c) means for removably securing said base to said second carriage at one of first and second positions such that said tool spindle axis of rotation is parallel and transverse, respectively, to said main spindle axis of rotation when secured to said second carriage;
d) drive means for said tool spindle; and
e) means for aligning said tool spindle axis of rotation relative to the main spindle axis of rotation when said base is in one of said first and second positions.

47. A machine tool as in claim 46, wherein:
a) said securing means includes a mounting block;
b) said mounting block includes an opening disposed downwardly and includes a top wall and opposite first and second walls extending from said top wall; and c) said first and seconds walls are disposed inwardly into and outwardly from said opening, respectively.

48. A machine tool as in claim 47, wherein:
a) said first and second walls are parallel to each other.

49. A machine tool as in claim 47, wherein:
a) said mounting block includes a wedge disposed within said opening; and
b) means for locking and unlocking said wedge.

50. A machine tool as in claim 49, wherein:
a) said wedge is trapezoidal in cross-section.

51. A machine tool as in claim 49, wherein:
a) said wedge includes a first surface disposed inwardly into said opening and a second surface cooperating with said opening second surface.

52. A machine tool as in claim 47, wherein:
a) said mounting block has a top surface; and
b) said locking and unlocking means is operable from said top of said mounting block, thereby permitting said mounting block to be lifted up from said second carriage.

53. A machine tool as in claim 47, wherein:
a) said means for aligning includes a diamond dowel and a pin dowel operably associated with said base and said mounting block.

54. A machine tool as in claim 47, wherein:
a) said base includes first and second end portions;
b) said tool spindle is operably associated with said first end portion; and
c) said mounting block is operably associated with said second end portion.

55. A machine tool as in claim 54, wherein:
a) said base second end portion is positionable in one of third and fourth positions, whereby said third position is to the left of said tool spindle and said fourth position is to the right of said tool spindle.

56. A machine tool as in claim 54, wherein:
a) each of said base second end portion and said mounting block includes three cooperating holes;
b) a respective number of screws received in said holes for securing said base to said mounting block; and
c) said holes disposed in said mounting block is arranged in a triangular pattern that is duplicated in said base at 90 degrees orientation.

57. A machine tool as in claim 46, wherein:
a) said drive means includes a shaft;
b) said tool spindle is parallel to said drive means shaft.

58. A machine tool as in claim 46, wherein:
a) said drive means includes a shaft; and
b) said tool spindle is transverse to said drive means shaft.

59. A machine tool as in claim 46, wherein:
a) a tool bit holder operably associated with said tool spindle; and
b) said tool bit holder is slidable relative to said spindle.

* * * * *